No. 781,063. PATENTED JAN. 31, 1905.
H. A. HENSLEY.
CALCULATING INSTRUMENT.
APPLICATION FILED FEB. 2, 1904.
2 SHEETS—SHEET 1.
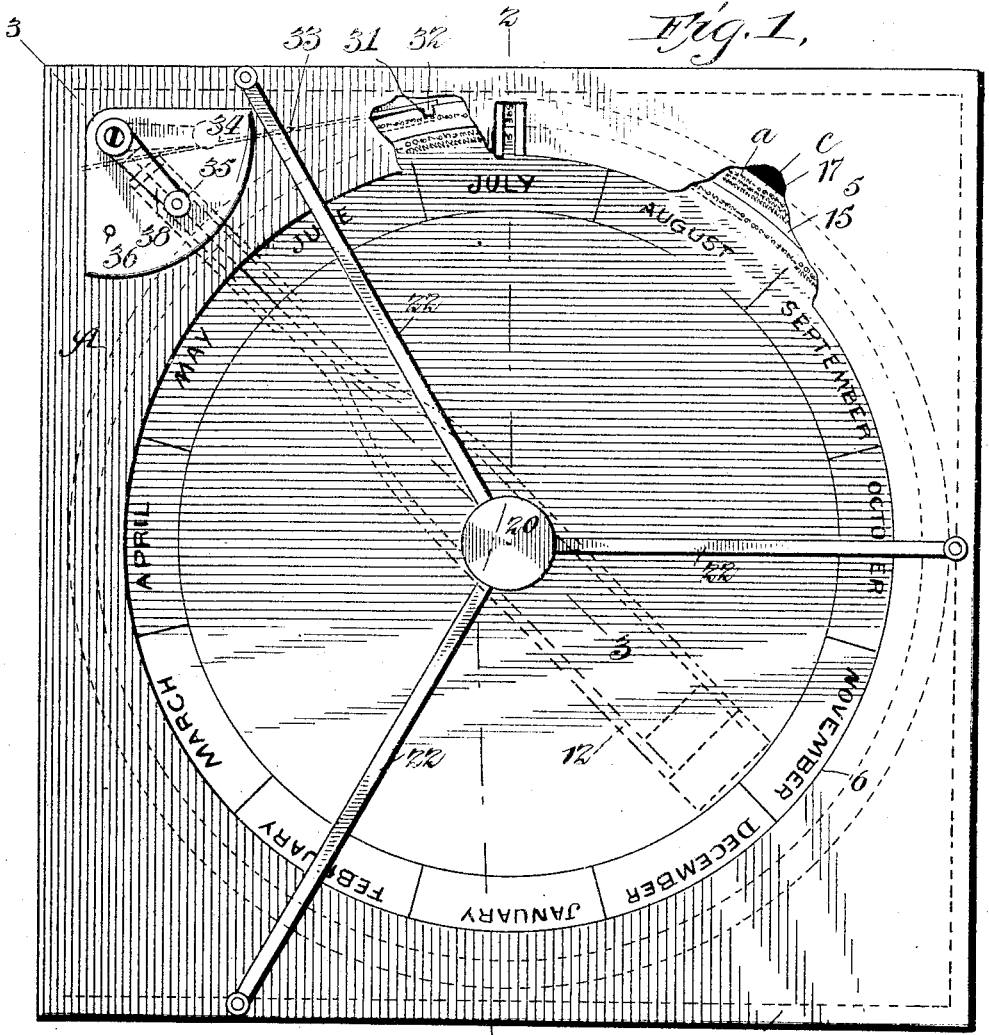
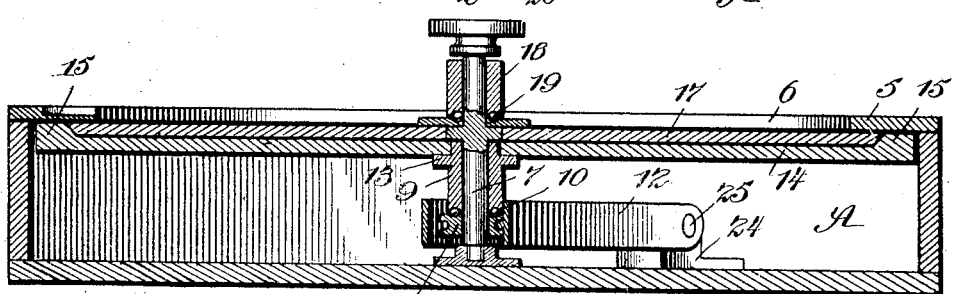
WITNESSES:
G. P. Kingsbury
V. E. Nichols.
INVENTOR
Hubert A. Hensley
BY
Griffin Bernhard & Cavanagh
ATTORNEYS No. 781,063. PATENTED JAN. 31, 1905.
H. A. HENSLEY.
CALCULATING INSTRUMENT.
APPLICATION FILED FEB. 2, 1904.
2 SHEETS—SHEET 2.
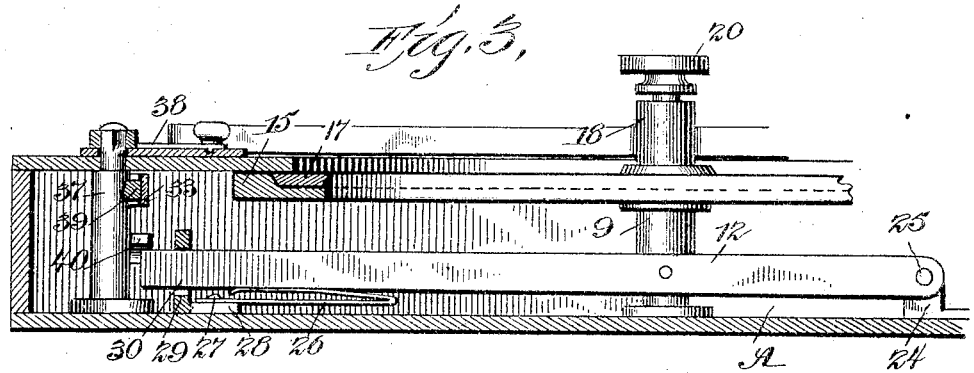
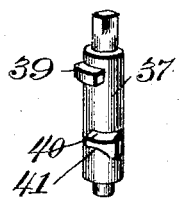
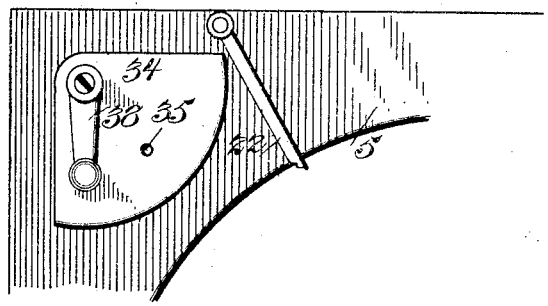
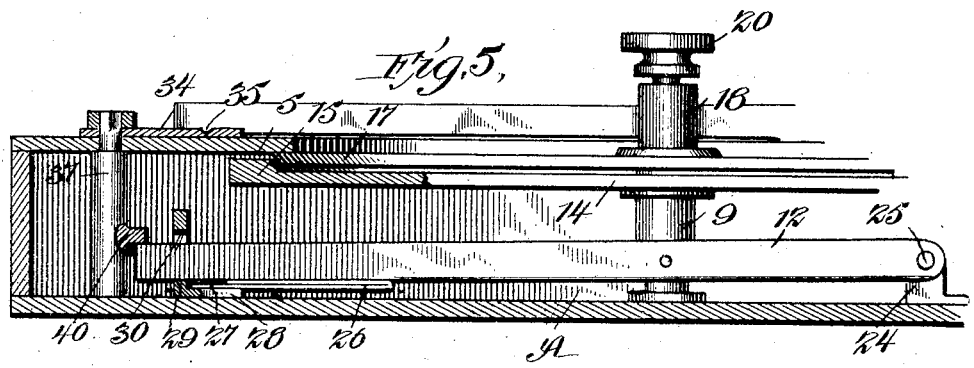
WITNESSES:
G. P. Kingsbury
V. E. Nichols
INVENTOR
Hubert A. Hensley
BY
Griffin Bernhard & Cavanagh
ATTORNEYS No. 781,063. Patented January 31, 1905.

UNITED STATES PATENT OFFICE.

HUBERT A. HENSLEY, OF NEW YORK, N. Y.

CALCULATING INSTRUMENT.

SPECIFICATION forming part of Letters Patent No. 781,063, dated January 31, 1905.

Application filed February 2, 1904. Serial No. 191,707.

*To all whom it may concern:*

Be it known that I, HUBERT A. HENSLEY, a subject of the King of Great Britain, residing in the city of New York, borough of Manhattan, in the county of New York and State of New York, have invented new and useful Improvements in Calculating Instruments, of which the following is a specification.

This invention relates to certain novel and useful improvements in a calculating instrument, and has particular application to a device of the type referred to whereby the number of days in a period between two dates may be speedily and accurately determined.

In carrying out the present invention I have especially in view as an object the provision of an instrument which will embody the essential and desired characteristics of simplicity, durability, economy, and effectiveness in operation.

As is well known, in banking-houses, commercial exchanges, and like establishments a large amount of time is consumed in reckoning the number of days from one date to another, as in calculating interest, dates of payment of notes, and the like. My invention is constructed with the particular object of performing this function in such manner that a saving of time and mental effort may be had.
With the above-recited objects and others of a like nature in view my invention consists in the construction, combination, and arrangement of parts, as is described in this specification, delineated in the accompanying drawings, and set forth in the appended claims.

In the accompanying drawings like reference characters indicate similar parts in all the views.

Figure 1 is a top plan view of an instrument embodying my improvements. Fig. 2 is a sectional view taken on the line 2 2 of Fig. 1. Fig. 3 is a similar view taken on the line 3 3 of Fig. 1. Fig. 4 is a plan view of a portion of the casing and illustrating the operating-switch. Fig. 5 is a vertical sectional view taken through the instrument and showing the relative positions of the numeral-disks when separated. Fig. 6 is a detail view of the switch-post.
Referring now to the drawings in detail, the letter A designates the casing of the instrument, which may be of any preferred form or shape, such casing in the present instance being shown as square. The casing or box is provided with a top cover 5, having a relatively large circular opening 6 cut in the face thereof. Arranged centrally of the box is a vertical post or spindle 7, revolubly mounted on the base-flange 8, secured to the bottom of the case. Surrounding the lower portion of the spindle is a sleeve 9, a ball-bearing, as at 10, being interposed between the lower end of the sleeve and the cross-bar 11 of the lever 12, the office of which lever will be more fully set forth hereinafter. The upper portion of the sleeve 9 is formed with a flanged shoulder 13, upon which is carried the circular disk 14. This disk has formed around the periphery thereof a raised or shouldered rim or flange 15, normally lying out of sight concealed by the cover of the casing, the only part of the flange to be seen appearing through the small rectangular slot 16 cut in the top wall of the casing, this slot communicating with the circular opening 6.

On the peripheral flange 15 is arranged a series of consecutive numbers, (shown at *a*,) these numbers running from "1" to "365," thereby corresponding to the number of days in the year. Carried by the spindle and arranged above the disk 14 in such manner that it normally rests in frictional contact therewith is a second circular disk, 17, having its upper face flush with the top of the flange 15. This disk 17 has marked on its upper face the names of the twelve months of the year in regular order, as is shown at *b*, while arranged circumferentially of the edge of this disk are numbers *c*, corresponding to the number of days in each month. For instance, where the word "August" appears the numbers run from "1" to "31." This disk 17 is so arranged that while the names of the months are at all times visible the numbers corresponding to the days of the month can only be seen when in line with the slot 16. Surrounding the upper portion of the spindle 7 is a sleeve 18, ball-bearings, as at 19, being interposed between the lower end of the sleeve and the disk, while a cap-screw 20 is threaded upon the upper extremity of the spindle. In order to support and give rigidity to the central spindle and the various parts of the instrument, I have provided a spider formed of the radiating arms 22, each connected at one end to the sleeve 18 and at the opposite end to the casing-top.

As has been above stated, the two disks 14 and 17 are designed to be normally held in frictional contact, and in order to accomplish this the lever 12 is pivoted at one end to the block 24 through the medium of the pin 25, the block in turn being rigidly secured to the base of the casing. As heretofore described, the spindle 7 passes through the cross-bar 10 of the lever, and this bar has a slight vertical movement on the spindle, the bar being normally pressed upward against the sleeve 9 of the lower disk through a tension-spring 26, secured beneath the free end of the lever.

The spring in the present instance comprises a flat strip doubled back upon itself, one end thereof being secured, as at 27, to the base 28 of the limiting-block 29, which latter is secured to the bottom of the casing, the end of the lever passing through a slot 30 in the block, so that the vertical movement of the lever end is limited.

When it is desired to use the instrument, the following operation is performed, and in order that my invention may be fully understood I will select a specific example in describing such operation: Suppose, for instance, the operator desires to find the number of days from July 15 to July 20. The year-disk 14, having the numbers ranging from "1" to "365," is rotated until the numeral "365" appears at the slot 16. In the periphery of this disk is a notch 31, so located that when the number "365" appears at the slot the notch will be in line to receive the lug 32, carried at the free end of the spring-latch 33, the opposite end of such latch being fastened to the side of the casing. Upon the top of the casing and in one corner thereof is a segmental plate 34, having the indicating stop-points 35 and 36 marked thereon. Vertically arranged within the casing and having its upper portion extending through the casing-top is the rotatable switch-post 37, that portion of the post extending through the top being of reduced diameter in cross-section and has secured thereto a switch lever or handle 38. This post is provided with an upper stud or projection 39 and a lower projection 40, the latter being arranged to one side of the upper lug, and has an inclined bearing-face 41 for a purpose hereinafter referred to. As has been previously stated, the two disks are normally in contact, and in operating the instrument the switch-lever is first turned to the point 35, which movement causes the lug 39 to press against the spring-latch 33 and forces the lug 32 into the notch 31 in the periphery of the disk, thus locking such disk against movement, with the number "365" appearing at the slot. The switch-lever is then moved to the point 36, and the inclined face of the projection 40, contacting with the end of the lever 12, forces the latter down against the tension of the spring 26 and permits the lower disk to drop out of frictional contact with the upper one, such lower disk, however, being held against rotary movement. The top or month disk may then be spun or rotated independent of the lower one and without disturbing the latter. The top disk 17 is turned until the date "July 15" appears at the slot in line with the number "365." Then the switch-lever is moved back into its original position, (shown in dotted lines in Fig. 1,) which movement permits the disks to resume their normal contacting position and also forces the spring-latch out of engagement with the disk 14, so that both disks may be rotated together. The disks are then turned or spun together, and when the desired date—"July 20" in the present instance—shows at the slot the number on the flanged disk appearing at the slot in the place of number "365" will be "5," or the number of days from July 15 to July 20. This is clearly shown in Fig. 1. I have chosen this example for its simplicity; but it will of course be evident that running sequentially, as the numbers do, from "1" to "365" and always starting with "365" the number of days between any two specified dates must appear at the upper end of the slot in place of the number "365," when the date to which it is desired to calculate appears at the lower end of the slot in place of the date from which the reckoning started.

While I have herein shown and described one particular embodiment of my invention, it is to be understood that I do not confine myself to all the precise details of construction, as there may be modifications and variations in some respects without departing from the spirit of the invention or sacrificing any of the advantages thereof.

Having thus described my invention, what I claim, and desire to secure by Letters Patent, is—

1. A calculating instrument, comprising a flanged disk member having marked on the flange thereof a series of consecutive numerals corresponding to the number of days in a year, a second disk member having an upper flat surface, flush with the flange of the first member, which upper, flat surface has marked thereon the names of months and numerals indicating the days of the months, spring-tensioned means for normally holding said members in engagement, whereby they may be moved together, and a switching device adapted to actuate the spring-tensioned means to cause said members to move out of engagement.

2. A calculating instrument comprising a member having marked thereon a series of numerals corresponding to the number of days in a year, a second member having marked thereon the names of months and numerals indicating the days in the months, said members being movable into coöperative relationship to indicate the number of days in a period between two specified dates, lever mechanism normally holding the members in frictional contact, means for operating the lever mechanism to throw the members out of frictional contact, and means for locking one of said members against movement.

3. A calculating instrument comprising a member provided with a peripheral, projecting flange on the upper surface thereof, which flange has marked thereon numerals indicating the days in a year, a second member arranged to have its upper flat surface flush with the upper surface of the flange, said second member having marked thereon characters indicating the days of the months, a latching device adapted to engage one of said members to lock the same against movement, means for normally holding the members in contact, and a switching device for operating the holding means to cause said disk to move out of engagement, said switching device also actuating the latching means.

4. A calculating instrument comprising a casing, a spindle rotatably mounted therein, a plurality of disks carried by said spindle, means for normally holding said disks in engagement whereby they may be rotated together, and a switch mechanism for throwing said disks out of engagement, whereby they may be independently rotated.

5. A calculating instrument comprising a casing, a top therefor provided with a circular opening and a slot communicating therewith, a disk rotatably mounted in the casing and having a series of numerals arranged adjacent to the periphery in such manner that the numbers are concealed from view except when directly beneath the slot, a second disk rotatably mounted within the casing and having a series of numerals marked thereon, which numerals are also concealed by the casing-top except when directly beneath the slot, tension means for normally holding said disks in contact, means for locking one of said disks against movement, and a switch for operating the tension means to permit said disks to move out of contact.

6. A calculating instrument comprising a casing, a disk having a series of numerals marked thereon, a second disk having another series of numerals marked thereon, said disks being so constructed and arranged that they are normally held in frictional contact, a latch adapted to engage with the periphery of one of said disks to hold the latter against movement, and means for moving the latch into and out of engagement with the periphery of the disk.

7. A calculating instrument comprising a casing, a spindle rotatably mounted therein, a plurality of disks carried by said spindle, a spring-actuated lever normally holding said disks in engagement, a latching device for holding one of said disks against movement, and a switch mechanism for actuating both the latch and the lever.

8. A calculating instrument comprising a casing, a spindle rotatably mounted therein, a plurality of disks carried by said spindle, a spring-actuated lever normally holding said disks in engagement, a latching device for holding one of said disks against movement, and a switch mechanism actuating both the latch and the lever, said switch comprising a post member provided with a plurality of projections designed, when the switch is moved, to engage at certain times with the latch and the lever.

HUBERT A. HENSLEY.

Witnesses:
   JACQUES WEINBERGER,
   ALFRED G. BERNHEIMER.